(12) United States Patent
Ayanam et al.

(10) Patent No.: US 10,048,970 B2
(45) Date of Patent: Aug. 14, 2018

(54) PORTABLE BOOT CONFIGURATION SOLUTION FOR THIN CLIENT DEVICE

(71) Applicant: American Megatrends, Inc., Norcross, GA (US)

(72) Inventors: Varadachari Sudan Ayanam, Suwanee, GA (US); Samvinesh Christopher, Suwanee, GA (US); Veerajothi Ramasamy, Duluth, GA (US); Muthukkumaran Ramalingam, Duluth, GA (US); Indira Valmiki, Anantapur (IN); Manikandan Ganesan Malliga, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 78 days.

(21) Appl. No.: 15/248,717

(22) Filed: Aug. 26, 2016

(65) Prior Publication Data

US 2018/0060083 A1 Mar. 1, 2018

(51) Int. Cl.
*G06F 9/44* (2018.01)
*G06F 9/4401* (2018.01)
*G06F 9/445* (2018.01)
*G06F 13/42* (2006.01)

(52) U.S. Cl.
CPC .......... *G06F 9/4406* (2013.01); *G06F 9/4415* (2013.01); *G06F 9/44505* (2013.01); *G06F 13/4282* (2013.01)

(58) Field of Classification Search
CPC ... G06F 9/4401; G06F 9/4406; G06F 9/44505
See application file for complete search history.

(56) References Cited

U.S. PATENT DOCUMENTS

| | | | |
|---|---|---|---|
| 6,654,797 B1 * | 11/2003 | Kamper | G06F 9/4416 709/203 |
| 7,237,103 B2 * | 6/2007 | Duncan | G06Q 30/0601 713/1 |
| 2009/0276524 A1 * | 11/2009 | Ohtani | G06F 8/60 709/224 |

* cited by examiner

*Primary Examiner* — Albert Wang
(74) *Attorney, Agent, or Firm* — Locke Lord LLP; Tim Tingkang Xia, Esq.

(57) ABSTRACT

Certain aspects direct to systems and methods for performing boot configuration of a thin client device with a portable storage device, such as a universal serial bus (USB) storage device. The system includes a computing device functioning as a thin client device, which has an interface under a protocol, such as the USB interface, allowing the portable storage device to be connected to the computing device via the interface. The portable storage device stores configuration data for configuring the computing device. Before booting, the computing device checks if the configuration data exists in a local storage device. If not, the computing device attempts to access the portable storage device, in order to automatically retrieve the configuration data from the portable storage device. Once the configuration data is obtained, the computing device may proceed with booting, and configure the computing device based on information of the configuration data without manual intervention.

20 Claims, 4 Drawing Sheets

US 10,048,970 B2

PORTABLE BOOT CONFIGURATION SOLUTION FOR THIN CLIENT DEVICE

FIELD

The present disclosure relates generally to computing device boot configuration technology, and more particularly to systems and methods for performing boot configuration of a thin client computing device with a portable storage device, such as a universal serial bus (USB) storage device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A thin client device or zero client device is a computer solution whose major role is to connect a physical machine or virtual machine via remote access protocol using the operating system (OS) and other applications programmed in the hardware. A thin client device can be a small device with minimal requirement for hardware such as keyboard, mouse, monitor, universal series bus (USB) port or Ethernet card, and can therefore be particular useful for education, health care, gaming, advertisement, or other uses. Once a remote session is established to a server using a thin client device, all the user activity is processed on the remote server, which can be a physical machine or a virtual machine, and the data is stored back in the remote server. Accordingly, the thin clients devices provide high security by storing data in a centralized location if having been configured appropriately to enhance security.

However, it is time-consuming and takes a lot of efforts for an administrator to configure all of the thin client devices one by one manually based on respective deployment location and need, especially when the thin client devices correspond respectively to different types of configuration developed by different vendors.

Therefore, an unaddressed need exists in the art to address the aforementioned deficiencies and inadequacies.

SUMMARY

Certain aspects of the present disclosure direct to a system, which includes a computing device functioning as a thin client of the system. The computing device includes a processor, an interface under a first protocol, and a local storage device storing computer executable code. The computer executable code, when executed at the processor, is configured to: determine, in a pre-booting process, whether configuration data exists in the local storage device; when the configuration data does not exist in the local storage device, access a portable storage device communicatively connected to the computing device via the interface under the first protocol, and retrieve the configuration data from the portable storage device; and boot the computing device, and configure the computing device in the booting based on information of the configuration data.

In certain embodiments, the first protocol is a universal serial bus (USB) protocol, and the portable storage device is a USB storage device.

In certain embodiments, the computer executable code is configured to configure the computing device based on the information of the configuration data in a first booting process of the computing device after a firmware deployment or a factory reset is performed to the computing device.

In certain embodiments, the configuration data is in a format of a configuration file. In one embodiment, the configuration file is in an INT file format or a vendor specific file format. In one embodiment, the configuration file includes settings recognized by and applied on the computing device, and the settings include: network configuration; network recovery; email address recovery; selection of types of operational modes; a number of monitors to be enabled on the computing device; and enabling or disabling of resource redirection on the computing device.

In certain embodiments, the computer executable code, when executed at the processor, is further configured to: generate an alert signal in response to a failure of accessing the portable storage device, or in response to determining the configuration data is not stored in the portable storage device.

In certain embodiments, the computer executable code, when executed at the processor, is further configured to: validate the configuration data retrieved from the portable storage device; and generate an alert signal in response to determining the configuration data retrieved from the portable storage device is invalid.

Certain aspects of the present disclosure direct to a method for performing boot configuration of a computing device with a portable storage device. In certain embodiments, the method includes: determining, by the computing device in a pre-booting process, whether configuration data exists in a local storage device of the computing device, wherein the computing device functions as a thin client of a system; when the configuration data does not exist in the local storage device, accessing, by the computing device, a portable storage device communicatively connected to the computing device via an interface under a first protocol, and retrieving the configuration data from the portable storage device; and booting the computing device, and configuring the computing device in the booting based on information of the configuration data.

In certain embodiments, the first protocol is a USB protocol, and the portable storage device is a USB storage device.

In certain embodiments, the computing device is configured based on the information of the configuration data in a first booting process of the computing device after a firmware deployment or a factory reset is performed to the computing device.

In certain embodiments, the configuration data is in a format of a configuration file. In one embodiment, the configuration file includes settings recognized by and applied on the computing device, and the settings include: network configuration; network recovery; email address recovery; selection of types of operational modes; a number of monitors to be enabled on the computing device; and enabling or disabling of resource redirection on the computing device.

In certain embodiments, the method further includes: generating, by the computing device, an alert signal in response to a failure of accessing the portable storage device, or in response to determining the configuration data is not stored in the portable storage device.

In certain embodiments, the method further includes: validating, by the computing device the configuration data retrieved from the portable storage device; and generating, by the computing device, an alert signal in response to determining the configuration data retrieved from the portable storage device is invalid.

Certain aspects of the present disclosure direct to a non-transitory computer readable medium storing computer executable code. The computer executable code, when executed at a processor of a computing device functioning as a thin client of a system, is configured to: determine, in a pre-booting process, whether configuration data exists in a local storage device of the computing device; when the configuration data does not exist in the local storage device, access a portable storage device communicatively connected to the computing device via an interface under a first protocol, and retrieve the configuration data from the portable storage device; and boot the computing device, and configure the computing device in the booting based on information of the configuration data.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
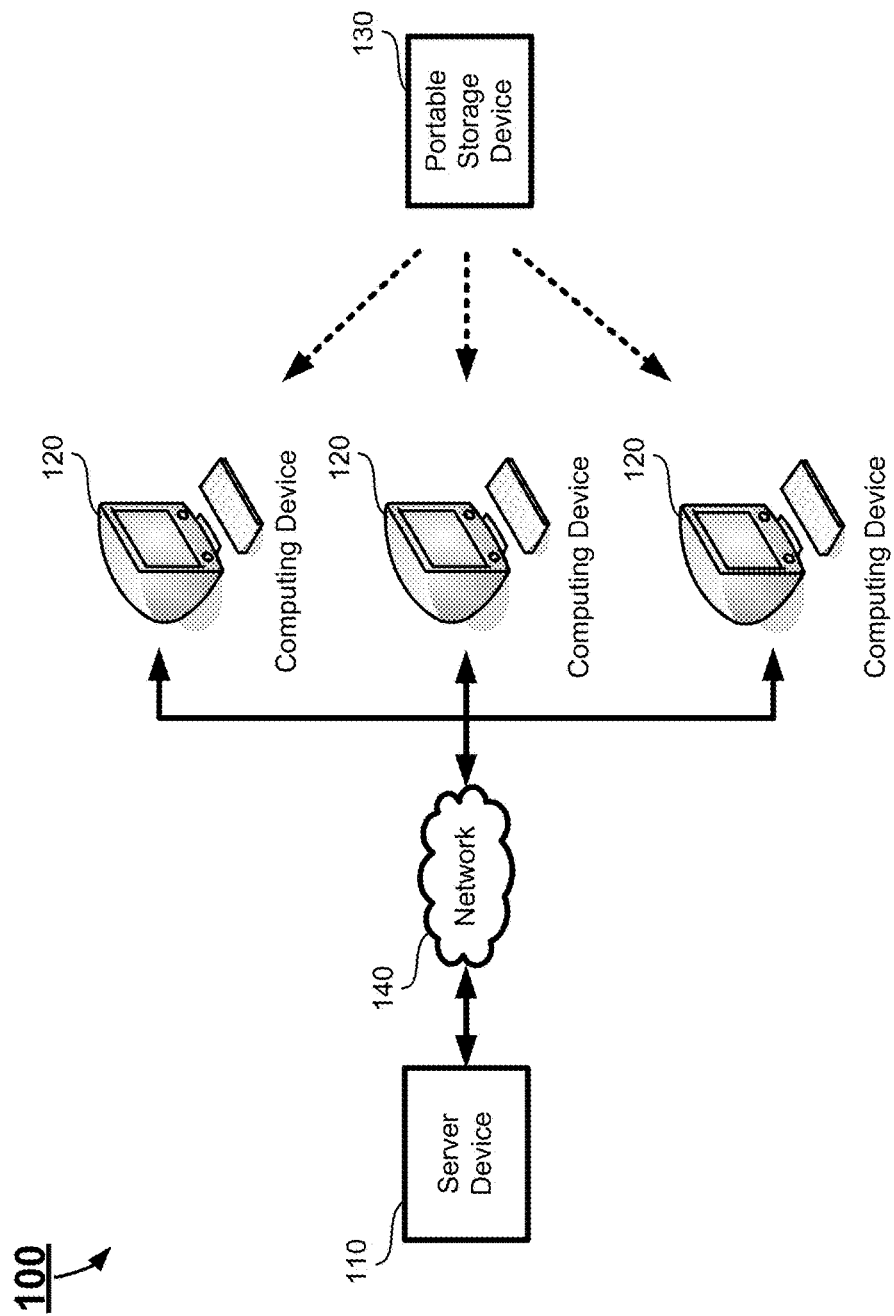
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems applied for portable boot configuration for thin client devices. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure direct to systems and methods for booting configuration for the thin client devices by using a portable configuring device. As discussed above, it is time-consuming and takes a lot of efforts for an administrator to configure the thin client devices one by one manually based on respective deployment location and need, especially when the thin client devices correspond respectively to different types of configuration developed by different vendors. Therefore, the systems and methods for configuring the thin client devices by using the portable configuring device can provide an efficient solution.

FIG. 1 schematically depicts a system according to certain embodiments of the present disclosure. In certain embodiments, the system 100 has a client-server structure. As shown in FIG. 1, the system 100 includes a server device 110 and a plurality of computing devices 120 communicatively connected to the service device 110 via a network 140. Further, the system 100 includes a portable storage device 130, which may be connected to any of the computing devices 120. In certain embodiments, the network 140 may be a wired or wireless network, and may be of various forms. Examples of the network 140 may include, but is not limited to, a local area network (LAN), a wide area network (WAN) including the Internet, or any other type of networks.

The server device 110 is a computing device functioning as a server of the system 100. In certain embodiments, the server device 110 may be a provider of resources or services for the computing devices 120, i.e., the clients of the system 100. For example, the system may be a virtual desktop infrastructure (VDI) system, and the server device 110 may be a VDI server, which provides a plurality of virtual machines (VM) for the thin clients (i.e., the computing devices 120), such that all users are accessing or connecting to the VMs) from the computing devices 120. The server device 110 provides most of the resources of the system 100, which will be shared to all of the VMs accessed by the users from the computing device 120. In certain embodiments, the system 100 may include more than one server device 110, which functions as one or more servers. In certain embodiments, a server may be implemented by one single server device 110, or by multiple server devices 110.

The computing devices 120 are devices functioning as the thin clients of the system 100. In certain embodiments, each of the computing devices 120, as a thin client, may be a lightweight computer with minimal requirement for hardware, whose user activity is processed on the VM provided by the server device 110. In certain embodiments, each of the computing devices 120 may be identical to one another.

The portable storage device 130 is a portable storage media capable of being connected to any of the computing devices 120 via an interface with a specific protocol, and used for storing configuration data of the computing devices 120. In certain embodiments, the portable storage device 130 may be used for automatically configuring the computing devices 120 so as to avoid manual intervention of going through step by step configuration for each of the computing devices 120. In certain embodiments, the specific protocol may be the universal serial bus (USB) protocol, and the portable storage device 130 may be a USB storage device, such as a USB flash drive, a USB thumb drive, a USB hard drive, or any other storage media using the USB interface to connect to the computing devices 120.

Figure 2:
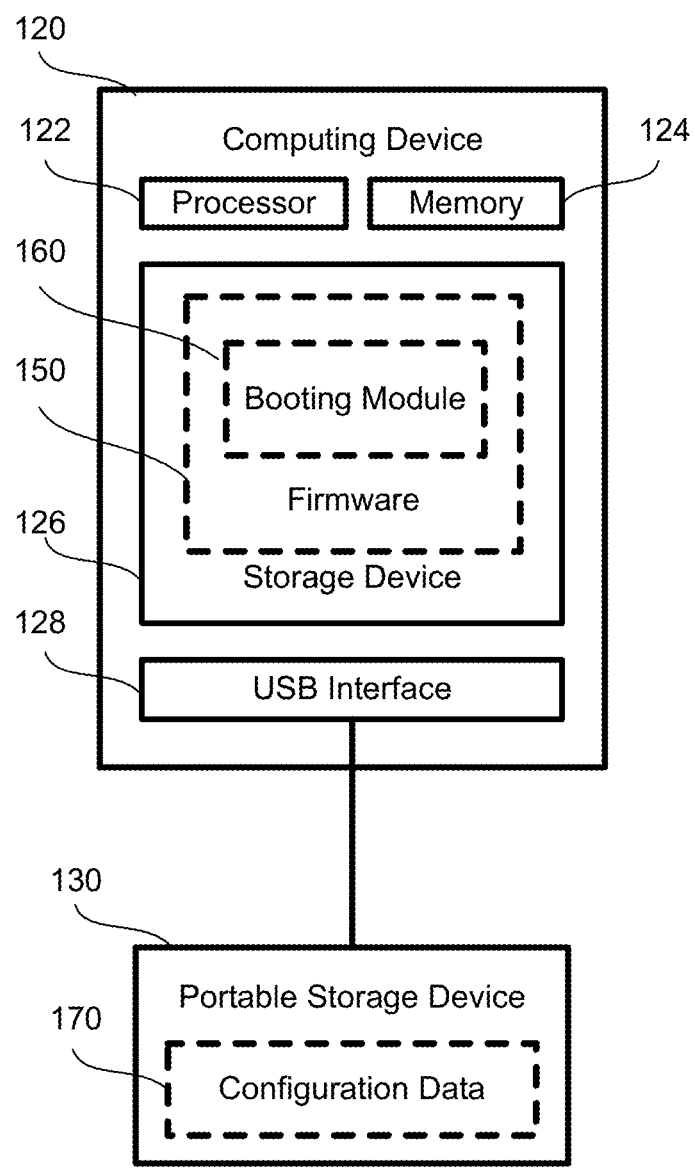
FIG. 2 schematically depicts a computing device and a portable storage device of the system according to certain embodiments of the present disclosure.

FIG. 2 schematically depicts a computing device and a portable storage device of the system according to certain embodiments of the present disclosure. As shown in FIG. 2, the computing device 120 includes a processor 122, a memory 124, a storage device 126, and a USB interface 128, and the portable storage device 130 is a USB storage device, which is connected to the computing device 120 via the USB interface 128. Further, the computing device 120 may include other hardware components and software components (not shown) to perform its corresponding tasks. For example, the computing device 120 may include, but not limited to, other required memory, interfaces, buses, Input/Output (I/O) modules, network interface cards (NICs) and peripheral devices.

The processor 122 is configured to control operation of the computing device 120. In certain embodiments, the processor 122 may be a central processing unit (CPU). The processor 122 can execute any computer executable code or instructions, such as the firmware 150 or other applications and instructions of the computing device 120. In certain embodiments, the computing device 120 may run on more than one processor, such as two processors, four processors, eight processors, or any suitable number of processors.

The memory 124 can be a volatile memory, such as the random-access memory (RAM), for storing the data and information during the operation of the computing device 120. In certain embodiments, the memory 124 may be a volatile memory array. In certain embodiments, the computing device 120 may run on more than one memory 124.

The storage device 126 is a local non-volatile data storage media for storing the computer executable code or instructions and other necessary data of the computing device 120. In certain embodiments, the computer executable code or instructions of the computing device 120 may be implemented as one or more application programs or modules. Examples of the storage device 126 may include non-volatile memory such as flash memory, memory cards, hard drives, floppy disks, optical drives, or any other types of data storage devices. In certain embodiments, the computing device 120 may have multiple storage devices 126, which may be identical storage devices or different types of storage devices, and the computer executable code or instructions of the computing device 120 may be stored in one or more of the storage devices 126 of the computing device 120. In certain embodiments, one of the storage devices 126 may be a basic input/output system (BIOS) chip, dedicated to storing the booting module 160 of the firmware 150 for performing the booting process of the computing device 120.

The USB interface 128 is a communication interface under the USB protocol. In certain embodiments, the USB interface 128 may include a USB port, and the portable storage device 130 may include a corresponding USB cable or USB connector to be inserted in the USB port to create a USB connection, such that the computing device 120 may access the portable storage device 130 via the USB connection.

As shown in FIG. 2, the computer executable code or instructions being stored in the local storage device 126 of the computing device 120 includes firmware 150. The firmware 150 is a collective management software managing the operation of the computing device 120. In certain embodiments, the firmware 150 may include one or more firmware modules, which may be implemented by the computer executable codes or instructions to collectively form the firmware 150. For example, the firmware 150 may include, among other things, a booting module 160. In certain embodiments, the booting module 160 may be an independent and separate module from the firmware 150. For example, the booting module 160 may be a part of the BIOS, which is stored in a BIOS chip.

The booting module 160 is a module configured to perform booting and configuration for the computing device 120. In certain embodiments, the booting process involves a plurality of startup functions for the computing device 120, including without being not limited to: initiation and power-on self-test, identifying the system devices, locating a bootloader software on the boot device, loading and executing the bootloader software, and giving control to the firmware 150 after the booting process. In certain embodiments, the booting module 160, when executed, may determine in a pre-booting process if the configuration data is available to perform the configuration in the booting process. If the configuration data is available, the booting module 160 may perform booting and configuring the computing device 120 based on the information of the configuration data. If the configuration data is not available, or if the configuration data is available but include invalid information, the booting module 160 may generate an alert signal to notify an end user of the computing device 120 that the booting process may not be properly performed.

As shown in FIG. 2, the computing device 120 does not have the configuration data stored in the local storage device 126. However, the configuration data 170 is available in the portable storage device 130, which is connected to the computing device 120 via the USB interface 128. In certain embodiments, the configuration data 170 being stored in the portable storage device 130 may include one or more configuration files, which may be in an INT file format, or other vendor-specific file formats that allows automatic validation and execution. The configuration files may contain different settings recognized by and applied on any of the computing devices 120. In certain embodiments, the settings may include, without being limited to, network configuration of the computing device 120 being static or manual, network recovery, email address recovery, types of operational modes that may run on the same or different virtual machines on the server device 130 for the computing device 120, a number of monitors to be enabled on the computing device 120, and/or the enabling or disabling of resource redirection on the computing device 120.

In certain embodiments, when the booting module 160 runs in a first booting process of the computing device 120 after a firmware deployment or a factory reset is performed to the computing device 120, the local storage device 126 of the computing device 120 may not have the configuration data required to perform the configuration process properly, as shown in FIG. 2. Thus, in the pre-booting process, the booting module 160 may first determine if the configuration data exists in the local storage device 126. Since the configuration data is not available in the local storage device 126, the booting module 160 then checks the availability of the portable storage device 130, and attempts to access the configuration data 170 from the portable storage device 130. Since the configuration data 170 is available in the portable storage device 130, the booting module 160 then retrieves the configuration data 170 from the portable storage device 130, and validates the information of the configuration data 170. If the information of the configuration data 170 is valid, the booting module 160 may then store a copy of the configuration data 170 in the local storage device 126 for future booting use, and then performs the booting process and configuring the computing device 120 based on the information of the configuration data 170.

It should be particularly noted that, in certain embodiments, if the USB connection between the portable storage device 130 and the computing device 120 is lost before the booting module 120 retrieves the configuration data 170 from the portable storage device 130, the booting module 120 may determine that the portable storage device 130 is not accessible. In this case, the booting module 160 may generate an alert signal to notify an end user of the computing device 120 that the booting process may not be properly performed.

Figure 3:
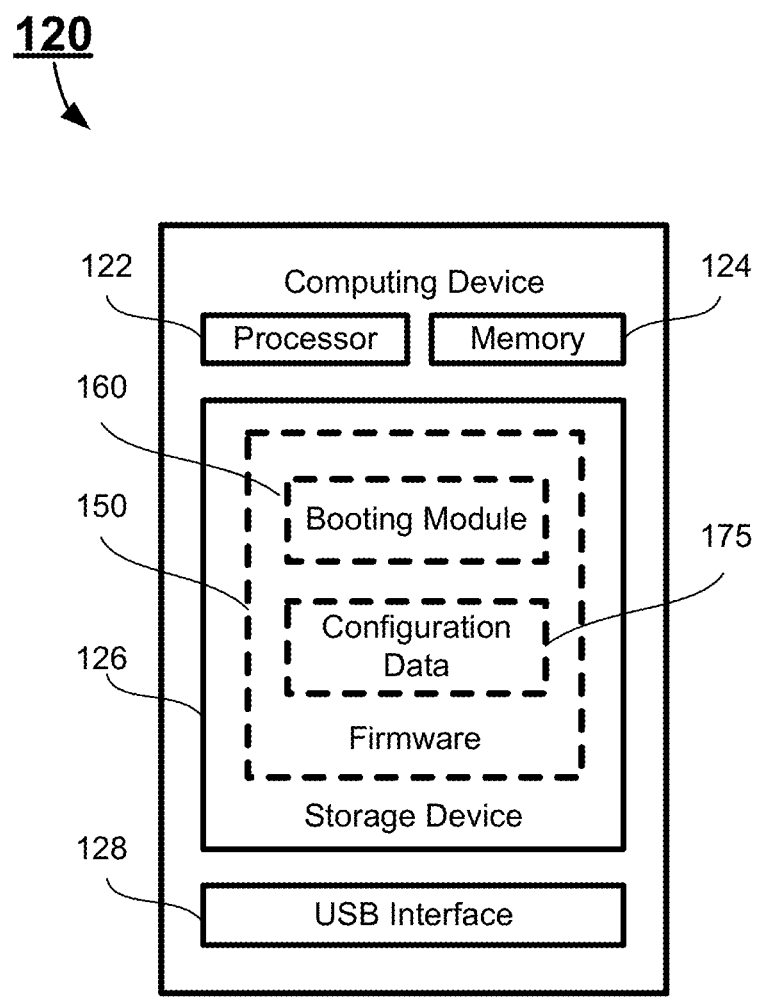
FIG. 3 schematically depicts a computing device having the configuration data according to certain embodiments of the present disclosure.

In certain embodiments, once a copy of the configuration data has been stored in the local storage device 126 of the computing device 120, the computing device 120 may be properly booted without the need of the portable storage device 130. FIG. 3 schematically depicts a computing device having the configuration data according to certain embodiments of the present disclosure. As shown in FIG. 3, the computing device 120 has a copy of the configuration data 175 stored in the local storage device 126. Thus, in the pre-booting process, the booting module 160 may first determine if the configuration data exists in the local storage device 126. Since the configuration data is now available in the local storage device 126, the booting module 160 may perform the booting process and configuring the computing device 120 based on the information of the configuration data 175, without the need of accessing the portable storage device 130.

Figure 4:
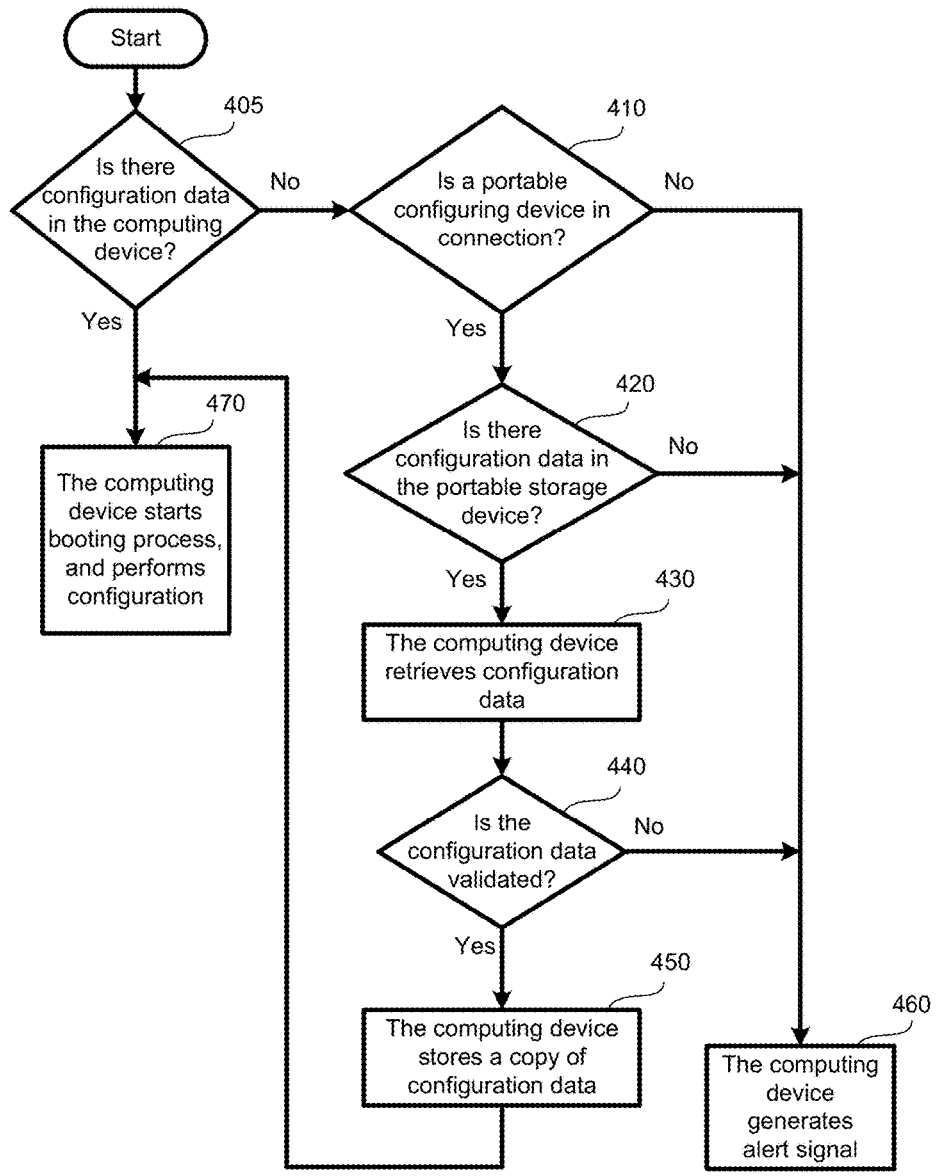
FIG. 4 depicts a flowchart showing a method for configuring the thin client device by using the portable configuring device according to certain embodiments of the present disclosure.

A further aspect of the present disclosure is directed to a method for performing boot configuration of a computing device with a portable storage device without manual intervention. FIG. 4 depicts a flowchart showing a method for configuring the thin client device by using the portable configuring device according to certain embodiments of the present disclosure. In certain embodiments, the method as shown in FIG. 4 may be implemented on a thin client (i.e., a computing device 120) of the system 100 as shown in FIG. 1, such as the computing device 120 as shown in FIG. 2 or 3. It should be particularly noted that the sequence of the procedures as described in the flowchart as shown in FIG. 4 may vary, and is thus not intended to limit the disclosure thereof.

As shown in FIG. 4, at procedure 405, the booting module 160 determines in a pre-booting process whether there is configuration data stored in the computing device 120 (i.e., the local storage device 126). If the configuration data 175 is available in the local storage device 126, as shown in FIG. 3, the booting module 160 may proceed to procedure 470 to start the booting process and perform the configuration of the computing device 120 based on the information of the configuration data 175. On the other hand, if there is no configuration data available in the local storage device 126, the booting module 160 may proceed to procedure 410.

At procedure 410, the booting module 160 determines whether there is a portable storage device 130 in connection with the computing device 120. If the portable storage device 130 is not available, the booting module 160 may proceed to procedure 460 to generate an alert signal to notify an end user of the computing device 120 that the booting process may not be properly performed. On the other hand, if the portable storage device 130 is available, the booting module 160 may proceed to procedure 420.

At procedure 420, the booting module 160 determines whether there is configuration data 170 available in the portable storage device 130. If there is no configuration data available in the portable storage device 130, the booting module 160 may proceed to procedure 460 to generate an alert signal to notify an end user of the computing device 120 that the booting process may not be properly performed. On the other hand, if the configuration data 170 is available in the portable storage device 130, the booting module 160 may proceed to procedure 430.

At procedure 430, the booting module 160 retrieves the configuration data 170 from the portable storage device 130. In certain embodiments, the configuration data 170 being stored in the portable storage device 130 may include one or more configuration files, which may be in an INI file format or other vendor-specific file formats that allow automatic validation and execution. Once the configuration data 170 is retrieved, at procedure 440, the booting module 160 checks if the information of the configuration data 170 is validated. If the information is invalid, the booting module 160 may proceed to procedure 460 to generate an alert signal to notify an end user of the computing device 120 that the booting process may not be properly performed. On the other hand, if the information of the configuration data 170 is successfully validated, the booting module 160 may proceed to procedure 450.

At procedure 450, the booting module 160 stores a copy of the configuration data 170 in the local storage device 126 of the computing device 120 for future usage. Once the copy of the configuration data 175 is stored in the local storage device, the booting module 160 may proceed to procedure 470 to start the booting process and perform the configuration of the computing device 120 based on the information of the configuration data 170.

In a further aspect, the present disclosure is related to a non-transitory computer readable medium storing computer executable code. The code, when executed at one or more processor, may perform the method as described above. In certain embodiments, the non-transitory computer readable medium may include, but not limited to, any physical or virtual storage media. In certain embodiments, the non-transitory computer readable medium may be implemented as the storage device 126 of the computing device 120 as shown in FIGS. 2 and 3.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a computing device functioning as a thin client, comprising a processor, an interface under a first protocol, and a local storage device storing computer executable code, wherein the computer executable code, when executed at the processor, is configured to:
determine, in a pre-booting process, whether configuration data for the thin client exists in the local storage device of the computing device functioning as the thin client;
when the configuration data for the thin client does not exist in the local storage device, access a portable storage device communicatively connected to the computing device via the interface under the first protocol, and retrieve the configuration data for the thin client from the portable storage device; and
boot the computing device as the thin client, and configure the computing device in the booting based on information of the configuration data for the thin client.

2. The system as claimed in claim 1, wherein the first protocol is a universal serial bus (USB) protocol, and the portable storage device is a USB storage device.

3. The system as claimed in claim 1, wherein the computer executable code is configured to configure the computing device based on the information of the configuration data in a first booting process of the computing device after a firmware deployment or a factory reset is performed to the computing device.

4. The system as claimed in claim 1, wherein the configuration data is in a format of a configuration file.

5. The system as claimed in claim 4, wherein the configuration file is in an INI file format or a vendor specific file format.

6. The system as claimed in claim 4, wherein the configuration file comprises settings recognized by and applied on the computing device, and the settings comprise:
network configuration;
network recovery;
email address recovery;
selection of types of operational modes;
a number of monitors to be enabled on the computing device; and
enabling or disabling of resource redirection on the computing device.

7. The system as claimed in claim 1, wherein the computer executable code, when executed at the processor, is further configured to:
generate an alert signal in response to a failure of accessing the portable storage device, or in response to determining the configuration data is not stored in the portable storage device.

8. The system as claimed in claim 1, wherein the computer executable code, when executed at the processor, is further configured to:

validate the configuration data retrieved from the portable storage device; and generate an alert signal in response to determining the configuration data retrieved from the portable storage device is invalid.

9. A method for performing boot configuration of a computing device with a portable storage device, the method comprising:

determining, by the computing device in a pre-booting process, whether configuration data for the thin client exists in a local storage device of the computing device, wherein the computing device functions as a thin client of a system;

when the configuration data for the thin client does not exist in the local storage device, accessing, by the computing device, a portable storage device communicatively connected to the computing device via an interface under a first protocol, and retrieving the configuration data for the thin client from the portable storage device; and booting the computing device as the thin client, and configuring the computing device in the booting based on information of the configuration data for the thin client.

10. The method as claimed in claim 9, wherein the first protocol is a universal serial bus (USB) protocol, and the portable storage device is a USB storage device.

11. The method as claimed in claim 9, wherein the computing device is configured based on the information of the configuration data in a first booting process of the computing device after a firmware deployment or a factory reset is performed to the computing device.

12. The method as claimed in claim 9, wherein the configuration data is in a format of a configuration file.

13. The method as claimed in claim 12, wherein the configuration file comprises settings recognized by and applied on the computing device, and the settings comprise:

network configuration;
network recovery;
email address recovery;
selection of types of operational modes;
a number of monitors to be enabled on the computing device; and
enabling or disabling of resource redirection on the computing device.

14. The method as claimed in claim 9, further comprising:
generating, by the computing device, an alert signal in response to a failure of accessing the portable storage device, or in response to determining the configuration data is not stored in the portable storage device.

15. The method as claimed in claim 9, further comprising:
validating, by the computing device the configuration data retrieved from the portable storage device; and
generating, by the computing device, an alert signal in response to determining the configuration data retrieved from the portable storage device is invalid.

16. A non-transitory computer readable medium storing computer executable code, wherein the computer executable code, when executed at a processor of a computing device functioning as a thin client of a system, is configured to:

determine, in a pre-booting process, whether configuration data for the thin client exists in a local storage device of the computing device functioning as the thin client;

when the configuration data for the thin client does not exist in the local storage device, access a portable storage device communicatively connected to the computing device via an interface under a first protocol, and retrieve the configuration data for the thin client from the portable storage device; and boot the computing device as the thin client, and configure the computing device in the booting based on information of the configuration data for the thin client.

17. The non-transitory computer readable medium as claimed in claim 16, wherein the first protocol is a universal serial bus (USB) protocol, and the portable storage device is a USB storage device.

18. The non-transitory computer readable medium as claimed in claim 16, wherein the computer executable code is configured to configure the computing device based on the information of the configuration data in a first booting process of the computing device after a firmware deployment or a factory reset is performed to the computing device.

19. The non-transitory computer readable medium as claimed in claim 16, wherein the computer executable code, when executed at the processor, is further configured to:
generate an alert signal in response to a failure of accessing the portable storage device, or in response to determining the configuration data is not stored in the portable storage device.

20. The non-transitory computer readable medium as claimed in claim 16, wherein the computer executable code, when executed at the processor, is further configured to:
validate the configuration data retrieved from the portable storage device; and
generate an alert signal in response to determining the configuration data retrieved from the portable storage device is invalid.

* * * * *